(12) United States Patent
Fifield

(10) Patent No.: US 6,781,951 B1
(45) Date of Patent: Aug. 24, 2004

(54) RADIO COMMUNICATION SYSTEM

(75) Inventor: Robert Fifield, Redhill (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/425,657

(22) Filed: Oct. 22, 1999

(30) Foreign Application Priority Data

Oct. 23, 1998 (GB) .............................................. 9823145

(51) Int. Cl.⁷ .............................................. H04J 11/00
(52) U.S. Cl. ...................................... 370/203; 370/210
(58) Field of Search ................................. 370/203, 206, 370/207, 208, 210, 480, 536, 537; 375/254, 260, 222, 261; 714/18, 748, 749

(56) References Cited

U.S. PATENT DOCUMENTS

| | | | |
|---|---|---|---|
| 5,125,100 A | 6/1992 | Katznelson | 455/6.1 |
| 5,610,908 A | 3/1997 | Shelswell et al. | 370/210 |
| 5,636,247 A * | 6/1997 | Kamerman et al. | 375/260 |
| 6,125,103 A * | 9/2000 | Bauml et al. | 370/203 |
| 6,314,146 B1 * | 11/2001 | Tellado et al. | 375/346 |

FOREIGN PATENT DOCUMENTS

EP  0743768 A1  11/1996  ............. H04J/1/00

OTHER PUBLICATIONS

Muller et al, A Comparison Of Peak Power Reduction Schemes For OFDM, IEEE, pp. 1–5, 1997.*

Kamerman et al, OFDM encoding with reduced crestfactor, Wireless Networking & Mobile Comput. Res., AT&T Bell Labs, pp. 182–186, Nov. 1994.*

X. Li et al., "Effects of Clipping and Filtering on the Performance of OFDM", IEEE Vehicular Technology Conference, May 1997, pp. 1634–1638.

* cited by examiner

*Primary Examiner*—Frank Duong

(57) ABSTRACT

A method of operating a radio communication system uses orthogonal signals for transmission of packets of data between two or more stations. In the transmitter data is encoded onto a plurality of orthogonal carriers by a differential phase modulation technique, for example DQPSK. The carriers are combined into a single signal by an inverse discrete Fourier transform and clipped at a predetermined amplitude before being transmitted to reduce the crest factor of the transmitted signal. The phase of one or more of the carriers is randomized before each data packet, hence a different crest factor will result for retransmissions of the same packet. This ensures that if a packet is difficult to transmit, because of reduced signal to noise ratio caused by clipping, it will retransmit successfully.

12 Claims, 1 Drawing Sheet

RADIO COMMUNICATION SYSTEM

BACKGROUND OF THE INVENTION

The present invention relates to a radio communication system employing orthogonal signal transmission techniques for the transmission of packets of data. The present invention also relates to a transmitter for use in such a system to a method of operating such a system and to a signal transmitted in such a system. While the present specification describes a system employing Orthogonal Frequency Domain Multiplexing (OFDM), it is to be understood that such techniques are equally applicable to other systems transmitting orthogonal signals, for example Code Division Multiple Access (CDMA).

OFDM, also known as MultiCarrier Modulation (MCM) or Discrete MultiTone modulation (DMT), is a technique by which data is transmitted at a high rate by modulating several low bit rate carriers in parallel, rather than one high bit rate carrier. OFDM is spectrally efficient, and has been shown to be effective for high performance digital radio links. Application areas include: Wireless Asynchronous Transfer Mode (WATM), for high speed, short distance radio links between computer systems; Digital Audio Broadcasting (DAB), for high quality audio signals; Microwave Video Distribution System (MVDS); and future mobile radio systems such as Universal Mobile Telecommunication System (UMTS).

An important characteristic of a Radio Frequency (RF) signal for transmission is the crest factor, defined as the ratio of the peak value of an AC waveform to its Root Mean Square (RMS) value. In an OFDM system the crest factor can be high since it is possible for the signals on each of the carriers to be in phase (giving rise to a peak value that is the product of the number of carriers and the amplitude of the signal on each carrier), but on average the phases will be randomly distributed (giving rise to a much lower mean value). For example, in a 16 carrier OFDM system the peak power can be 16 times the mean transmission power.

If such signals are to be transmitted without distortion, a high specification transmitter is required with good linearity. Generally such an transmitter has a poor DC to RF power conversion efficiency which may result in the generation of excessive amounts of heat and which also has a detrimental effect on battery life if the transmitter is incorporated in portable equipment. Various approaches have therefore been investigated for reducing the crest factor.

One technique is to prevent the combination of certain phase modulation states from being applied to the carriers. However, this has the disadvantage that more symbols need to be transmitted for a given amount of data as each symbol has fewer available states. Such techniques are well known, one example being a ¾ rate scheme for a four carrier OFDM system, which reduces the crest factor from 4 to 1.9. U.S. Pat. No. 5,636,247 describes a more sophisticated technique of this type. When applied to a 16 carrier system a crest factor reduction of 3 dB can be achieved using a $^{13}/_{16}$ rate scheme.

An alternative method is described in U.S. Pat. No. 5,610,908, in which a number of closely spaced carriers are modulated (in this case using QPSK) and then transformed to the time domain by an Inverse Fast Fourier Transform (IFFT), as is usual. The signals are then limited and transformed back to the frequency domain by a Fast Fourier Transform (FFT) where phase and amplitude adjustments may be made to some of the signals, and then transformed back to the time domain with an IFFT. From here the transmission proceeds as normal. An example is given of a 2048 carrier OFDM system for which a simulation of twenty random signals, initially having a crest factor of 9.38 dB, demonstrated that the crest factor could be reduced to 3.4 dB.

It can be seen that although the techniques outlined above can reduce the crest factor they cannot reduce it to unity (corresponding to a constant envelope modulation). An alternative known technique for reducing the crest factor is clipping, where the baseband signal is amplitude clipped at a constant level, therefore removing signal peaks and reducing the crest factor. Clipping is a simple technique to implement, although because it is a nonlinear process some care is required in its use.

The effect of clipping in a 128 carrier OFDM system is discussed in the paper "Effects of Clipping and Filtering on the Performance of OFDM" by X Li and L J Cimini, Proceedings of the 47th IEEE Vehicular Technology Conference, May 1997, pp. 1634–1638. In this paper it is shown that setting a clipping level at about 1.5 times the mean power level provides a substantial reduction in crest factor without a substantial increase in bit error rate.

A problem with the use of clipping, not addressed in the prior art, is that certain OFDM symbols are adversely affected by it whereas others are unaffected. If a number of adversely affected symbols are transmitted in a packet the receiver is likely to fail to demodulate the packet and request its retransmission. The sender will repeat the packet and encounter the same problem. Hence, certain packets are very unlikely to be received without error.

SUMMARY OF THE INVENTION

An object of the present invention is to alleviate the problem that certain packets are very difficult to transmit.

According to a first aspect of the present invention there is provided a method of operating a radio communication system comprising encoding data onto a plurality of orthogonal carriers by differential phase modulation, combining the phase modulated signals, clipping the combined signal to limit the crest factor and transmitting the clipped signal as data packets between at least two stations, characterised by randomising the initial phases of at least one, of the carriers before transmission of a packet.

According to a second aspect of the present invention there is provided a transmitter for transmitting orthogonal signals, comprising differential phase modulation means for modulating data onto a plurality of orthogonal carriers, means for combining the phase modulated signals, clipping means for limiting the crest factor of the combined signal and transmission means for transmitting the clipped signal, characterised in that means are provided for randomising the initial phases of at least one of the carriers before transmission of a packet.

According to a third aspect of the present invention there is provided a radio communication system comprising a plurality of transmitters made in accordance with the present invention.

According to a fourth aspect of the present invention there is provided a radio signal comprising a plurality of orthogonal carriers onto which packets of data are encoded by differential phase modulation, the signal being clipped to limit its crest factor, characterised in that the initial phase of at least one of the carriers is randomised at the start of a data packet.

The present invention is based upon the recognition, not present in the prior art, that by varying the initial phase states of the carriers comprising an OFDM signal, repetition of a symbol will result in a different crest factor.

BRIEF DESCRIPTION OF THE DRAWINGS

Embodiments of the present invention will now be described, by way of example, with reference to the accompanying drawings, wherein.

DETAILED DESCRIPTION OF THE PREFERRED EMBODIMENTS

Figure 1:
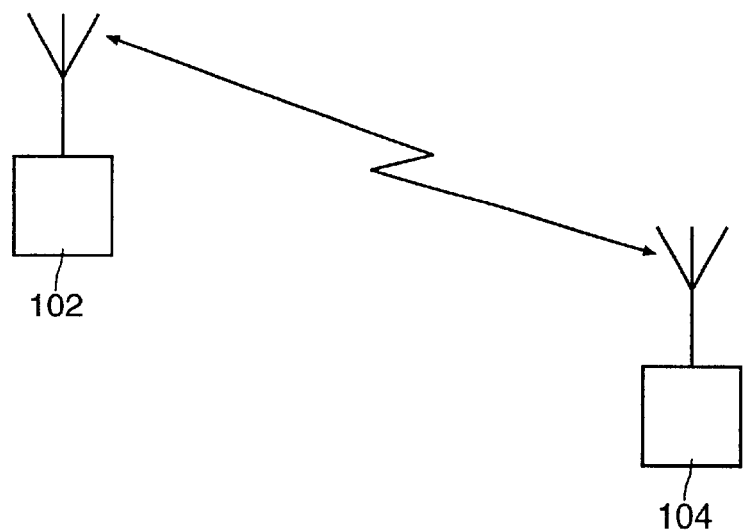
FIG. 1 is a block schematic diagram of a system in accordance with the present invention.

The system shown in FIG. 1 comprises two stations 102, 104, each containing a transceiver, with a two-way radio communication link between them. The stations 102, 104 can be of many different types depending on the particular application area. For example, in a WATM system the first station 102 could be a personal computer and the second station 104 a printer. Alternatively, in a UMTS system the first station 102 could be a cellular telephone and the second station 104 a cellular base station.

Figure 2:
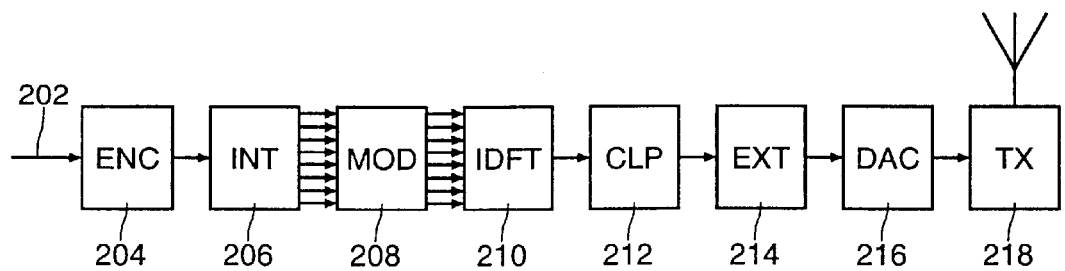
FIG. 2 is a block diagram of part of an embodiment of a transmitter made in accordance with the present invention.

The part of a transmitter shown in FIG. 2 is that relating to the encoding of an input bitstream 202 and its modulation for transmission. Operational parameters of all blocks shown are controlled by a controller (not shown). The bitstream 202 comprises data to be transmitted, passed from a Medium Access Control (MAC) layer. The data is first passed to an encoding block (ENC) 204, which generates a required stream of symbols in an appropriate form for the modulation scheme being used for transmission, for example two bit symbols if Differential Quadrature Phase Shift Keying (DQPSK) is to be used.

An interleaver (INT) 206 takes this stream of input symbols and outputs each symbol onto a respective one of its parallel output lines. Each output line corresponds to an OFDM carrier for transmission, so there are the same number of output lines from the interleaver 206 as the number of carriers, eight in the figure.

The symbols on each of the output data lines from the interleaver 206 are then modulated by a modulator MOD 208 using the required modulation scheme, for example DQPSK. The modulated data is then inverse discrete Fourier transformed by an IDFT block 210 (or equivalently is inverse fast Fourier transformed), which block also recombines the output data into a serial stream.

This serial data stream is a digital representation of the waveform to be transmitted, including any amplitude peaks, and is next passed to a clipping block (CLP) 212 which limits the signal amplitude to the required maximum level. A guard band between OFDM symbols is added by an extender block (EXT) 214, to reduce problems of inter-symbol interference, before the data is passed to a digital to analogue converter (DAC) 216. The output signal is then passed to radio transmission means 218, which translate it to the required frequency and amplify it for transmission.

Figure 3:
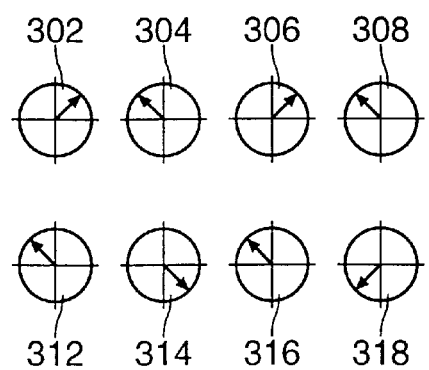
FIG. 3 is a diagram of a succession of phase states of two carriers in an OFDM system in accordance with the present invention.

FIG. 3 shows a succession of the phase states of two of the output data lines from the modulator 208, which modulator is employing DQPSK differentially encoded with time. There are four possible values for each phase state, thereby encoding two-bit symbols. The first phase state 302, 312 in each carrier in each output OFDM symbol defines the initial phase reference for that carrier and symbol.

Hence, considering the first carrier, the phase of the second state 304 relative to the first state 302 encodes the value of the first two-bit symbol, similarly the phase of the third state 306 relative to the second state 304 provides the value of the second symbol, and the phase of the fourth state 308 relative to the third state 306 encode the third symbol. Symbols on the second carrier are encoded in the same way, using phase differences between the various states 312, 314, 316, 318.

In prior art modulators, the initial phase state of each carrier 302, 312 is set to a predetermined value at the start of each OFDM symbol. This has the effect that a given OFDM symbol will always be transmitted with the same combination of phase states. However, such a scheme has a significant disadvantage. If a symbol is adversely affected by clipping, meaning that the clipping has reduced its signal to noise ratio significantly, it is likely to be received incorrectly. If one or more adversely affected symbols are transmitted in a packet to a receiver, the receiver is likely to fail to demodulate the packet correctly. As a result of this error the receiver will generate an Automatic Repeat reQuest (ARQ) message and the packet will be repeated. However, the same OFDM symbols will be generated, having the same reduced signal to noise ratio as a result of clipping. Hence it is likely that the packet will be received erroneously again.

A method in accordance with the invention circumvents this problem by randomising the initial phases of the carriers at the start of each OFDM symbol. This could be done in a variety of ways known to the person skilled in the art. One example would be to use the state of the last transmitted symbol on a carrier in a packet as the reference phase for the first symbol on the respective carrier in the following packet.

The effect of the randomising of initial phases is that when a packet is retransmitted a different combination of phase states will be used. Each problematic OFDM symbol is therefore likely to have a different crest factor and an improved signal to noise ratio (since the clipping level is selected so that only a few combinations of phase states have a sufficiently poor signal to noise ratio to cause reception difficulties). Hence the retransmitted packet is more likely to be received correctly. It is not necessary to randomise all initial carriers, but the more that are randomised the greater the likelihood that a retransmission will be successful.

Although the present invention has been described in relation to DQPSK modulation, it will be appreciated that it can be applied to a wide range of other modulation schemes. All that is necessary is that the modulation scheme selected has the property that a phase reference for each carrier is the state of a carrier at the start of each OFDM symbol.

It will also be appreciated that the present invention is applicable to orthogonal modulation techniques other than OFDM, for example CDMA.

From reading the present disclosure, other modifications will be apparent to persons skilled in the art. Such modifications may involve other features which are already known in radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

What is claimed is:

1. A method of operating a radio communication system, the method comprising:
   encoding data onto a plurality of orthogonal carriers by differential phase modulation;
   combining the phase modulated signals;
   clipping the combined signal to limit the crest factor;
   transmitting the clipped signal as data packets between at least two wireless stations;
   re-transmitting a data packet if an error is detected, wherein the initial phases of at least one of the carriers is randomized before re-transmission of the data packet.

2. A method as claimed in claim 1, wherein the initial phase of at least one of said carriers is related to the state of the last transmitted symbol on that carrier.

3. A method as claimed in claim 1, wherein the initial phase of at least one of said carriers is different on a repeat transmission of the same packet.

4. A transmitter for transmitting orthogonal signals, the transmitter comprising:
   differential phase modulation means for modulating data onto a plurality of orthogonal carriers;
   means for combining the phase modulated signals;
   clipping means for limiting the crest factor of the combined signal;
   wireless transmission means for transmitting the clipped signal; and
   means for randomising the initial phases of at least one of the carriers of a data packet if an error is detected, before a re-transmission of the data packet.

5. A transmitter as claimed in claim 4, wherein means are provided for setting the initial phase of at least one of said carriers by reference to the state of the last transmitted symbol on that carrier.

6. A transmitter as claimed in claim 4, wherein means are provided for setting the initial phase of at least one of said carriers to a different state on a repeat transmission of the same packet.

7. A radio communication system comprising a plurality of transmitters as claimed in claim 4.

8. A radio signal, for use with a transmitter or receiver, the radio signal comprising a plurality of orthogonal carriers onto which packets of data are encoded by differential phase modulation, the signal being clipped to limit its crest factor, wherein the initial phase of at least one of the carriers of a data packet if an error is detected is randomized, before re-transmission of the data packet by the transmitter.

9. A signal as claimed in claim 8, wherein the initial phase of at least one of said carriers is related to the state of the last transmitted symbol on that carrier.

10. A signal as claimed in claim 8, wherein the initial phase of at least one of said carriers is different on a repeat transmission of the same packet.

11. A radio communication system comprising a plurality of transmitters as claimed in claim 5.

12. A radio communication system comprising a plurality of transmitters as claimed in claim 6.

* * * * *